US008250454B2

(12) United States Patent
Farouki et al.

(10) Patent No.: US 8,250,454 B2
(45) Date of Patent: Aug. 21, 2012

(54) CLIENT-SIDE COMPOSING/WEIGHTING OF ADS

(75) Inventors: Karim Farouki, Seattle, WA (US); Blaise Aguera y Arcas, Seattle, WA (US); Brett D. Brewer, Sammamish, WA (US); Steven Drucker, Bellevue, WA (US); Gary W. Flake, Bellevue, WA (US); Tomasz Kasperkiewicz, Redmond, WA (US); Stephen L. Lawler, Redmond, WA (US); Donald James Lindsay, Mountain View, CA (US); Adam Sheppard, Seattle, WA (US); Richard Stephen Szeliski, Bellevue, WA (US); Jeffrey Jon Weir, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1084 days.

(21) Appl. No.: 12/062,106

(22) Filed: Apr. 3, 2008

(65) Prior Publication Data

US 2009/0254820 A1 Oct. 8, 2009

(51) Int. Cl.
*G06K 9/54* (2006.01)

(52) U.S. Cl. ........ 715/201; 715/210; 715/234; 382/285; 382/229; 382/302

(58) Field of Classification Search .................. 715/210, 715/234, 273, 760; 382/285, 302, 229
See application file for complete search history.

(56) References Cited

U.S. PATENT DOCUMENTS

| | | | | |
|---|---|---|---|---|
| 5,124,915 | A | 6/1992 | Krenzel | |
| 5,489,922 | A | 2/1996 | Zloof | |
| 5,832,296 | A | 11/1998 | Wang et al. | |
| 5,964,701 | A | 10/1999 | Asada et al. | |
| 6,034,661 | A * | 3/2000 | Servan-Scheiber et al. | 345/668 |
| 6,097,374 | A | 8/2000 | Howard | |
| 6,244,873 | B1 | 6/2001 | Hill et al. | |
| 6,314,184 | B1 | 11/2001 | Fernandez-Martinez | |
| 6,380,923 | B1 | 4/2002 | Fukumoto et al. | |
| 6,710,774 | B1 | 3/2004 | Kawasaki et al. | |
| 6,728,706 | B2 | 4/2004 | Aggarwal et al. | |
| 6,804,659 | B1 * | 10/2004 | Graham et al. | 705/14.49 |
| 6,853,982 | B2 | 2/2005 | Smith et al. | |

(Continued)

FOREIGN PATENT DOCUMENTS

WO WO2007089951 A1 8/2007

(Continued)

OTHER PUBLICATIONS

Noah Snavely et al. Photo Tourism: Exploring Photo Collections in 3D,Jul. 3, 2006 , ACM Transactions on Graphics (TOG)—Proceedings of ACM SIGGRAPH 2006 vol. 25 Issue 3, 835-842.*

(Continued)

*Primary Examiner* — Adam M Queler
*Assistant Examiner* — Howard Cortes
(74) *Attorney, Agent, or Firm* — Lee & Hayes, PLLC

(57) ABSTRACT

The claimed subject matter provides a system and/or a method that facilitates displaying relevant advertisements to a user. A display engine can browse a portion of image data during a browsing session. An evaluator can identify a context related to two or more concurrent and on-going browsing sessions. An ad selector can locate an ad from a data store based on the identified context and seamlessly incorporate and display the ad into at least one of the browsing sessions.

20 Claims, 10 Drawing Sheets

U.S. PATENT DOCUMENTS

| | | | | |
|---|---|---|---|---|
| 6,885,939 | B2 | 4/2005 | Schmidt et al. | |
| 6,901,379 | B1 | 5/2005 | Balter et al. | |
| 6,907,345 | B2 | 6/2005 | Shipley et al. | |
| 6,928,615 | B1 | 8/2005 | Haitsuka et al. | |
| 6,938,218 | B1 | 8/2005 | Rosen | |
| 7,075,513 | B2 | 7/2006 | Silfverberg et al. | |
| 7,133,054 | B2 * | 11/2006 | Aguera y Arcas | 345/666 |
| 7,136,875 | B2 * | 11/2006 | Anderson et al. | 1/1 |
| 7,145,454 | B2 | 12/2006 | Linjama et al. | |
| 7,145,549 | B1 | 12/2006 | Sun | |
| 7,188,153 | B2 | 3/2007 | Lunt et al. | |
| 7,221,364 | B2 | 5/2007 | Matsumoto et al. | |
| 7,263,393 | B2 | 8/2007 | Smith et al. | |
| 7,269,590 | B2 | 9/2007 | Hull et al. | |
| 7,286,708 | B2 | 10/2007 | Aguera Y Arcas | |
| 7,289,814 | B2 | 10/2007 | Amir et al. | |
| 7,337,127 | B1 | 2/2008 | Smith et al. | |
| 7,375,629 | B1 | 5/2008 | Moyer | |
| 7,602,301 | B1 | 10/2009 | Stirling et al. | |
| 7,696,860 | B2 | 4/2010 | Gilson et al. | |
| 2003/0023485 | A1 | 1/2003 | Newsome | |
| 2003/0142065 | A1 | 7/2003 | Pahlavan | |
| 2003/0187660 | A1 | 10/2003 | Gong | |
| 2004/0032395 | A1 | 2/2004 | Goldenberg et al. | |
| 2004/0073644 | A1 | 4/2004 | Koch et al. | |
| 2004/0169674 | A1 | 9/2004 | Linjama | |
| 2004/0198398 | A1 | 10/2004 | Amir et al. | |
| 2004/0263473 | A1 | 12/2004 | Cho et al. | |
| 2005/0113167 | A1 | 5/2005 | Buchner et al. | |
| 2005/0134610 | A1 | 6/2005 | Doyle et al. | |
| 2006/0033716 | A1 | 2/2006 | Rosenberg et al. | |
| 2006/0064411 | A1 | 3/2006 | Gross et al. | |
| 2006/0067573 | A1 | 3/2006 | Parr et al. | |
| 2006/0112111 | A1 | 5/2006 | Tseng et al. | |
| 2006/0164383 | A1 | 7/2006 | Machin et al. | |
| 2006/0179453 | A1 * | 8/2006 | Kadie et al. | 725/34 |
| 2006/0200434 | A1 | 9/2006 | Flinn et al. | |
| 2006/0212353 | A1 | 9/2006 | Roslov et al. | |
| 2006/0218153 | A1 | 9/2006 | Voon et al. | |
| 2006/0224583 | A1 | 10/2006 | Fikes et al. | |
| 2006/0230058 | A1 | 10/2006 | Morris | |
| 2006/0282327 | A1 | 12/2006 | Neal et al. | |
| 2007/0026798 | A1 | 2/2007 | Hoogstra | |
| 2007/0031064 | A1 | 2/2007 | Zhao et al. | |
| 2007/0094066 | A1 | 4/2007 | Kumar et al. | |
| 2007/0129882 | A1 | 6/2007 | Sano et al. | |
| 2007/0143281 | A1 | 6/2007 | Smirin et al. | |
| 2007/0175321 | A1 | 8/2007 | Baum et al. | |
| 2007/0180078 | A1 | 8/2007 | Murphy et al. | |
| 2007/0244750 | A1 | 10/2007 | Grannan et al. | |
| 2007/0271232 | A1 | 11/2007 | Mattox et al. | |
| 2007/0273558 | A1 | 11/2007 | Smith et al. | |
| 2007/0288439 | A1 | 12/2007 | Rappaport et al. | |
| 2008/0004989 | A1 | 1/2008 | Yi | |
| 2008/0027842 | A1 | 1/2008 | Suginaka | |
| 2008/0046218 | A1 | 2/2008 | Dontcheva et al. | |
| 2008/0046313 | A1 | 2/2008 | Chen | |
| 2008/0059571 | A1 | 3/2008 | Khoo | |
| 2008/0082565 | A1 | 4/2008 | Chang et al. | |
| 2008/0091692 | A1 | 4/2008 | Keith et al. | |
| 2008/0214944 | A1 | 9/2008 | Morris et al. | |
| 2008/0214949 | A1 | 9/2008 | Stivoric et al. | |
| 2008/0317292 | A1 | 12/2008 | Baker et al. | |
| 2009/0157503 | A1 | 6/2009 | Farouki et al. | |

FOREIGN PATENT DOCUMENTS

| | | | |
|---|---|---|---|
| WO | WO2007133047 | A1 | 11/2007 |
| WO | WO2008036969 | A2 | 3/2008 |

OTHER PUBLICATIONS

Marc Pellefeys et al. From images to 3d Models; Jul. 2002; Communitations of the ACM; vol. 45, No. 7; 51-55.*

Farringdon, et al., "Wearable Sensor Badge & Sensor Jacket for Context Awareness". <<http://citeseer.ist.psu.edu/cache/papers/cs/26981/http:zSzzSzwww-2.cs.cmu.eduzSzafszSzcs.cmu.eduz SzuserzSzsatyazSzWebzSzMCSALINKzSzPAPERSzSzfarringdon 99.pdf/farringdon99wearable.pdf>> Last accessed Mar. 20, 2008, 7 pages.

Metzger, et al., "FreeDigiter: A Contact-free Device for Gesture Control". <<http://www.static.cc.getech.edu/~thad/p/031_30_Gesture/iswc04-freedigiter.pdf>> Last accessed Mar. 20, 2008, 4 pages.

"Beyond Search—Semantic Computing and Internet Economics Awards", External Research & Programs: RFP Awards, May 27, 2007, 3 pages <<http://research.microsoft.com/ur/us/fundingopps/RFPs/beyondSearchAwards>>.

Bidoshi, Virtual Reality Visualization for Maps of the Future, PhD Dissertation, The Ohio State University, 2003, 202 pages.

Dwyer et al., "Trust and privacy concern within social networking sites: A comparison of Facebook and MySpace", Proceedings of the Thirteenth Americas Conference on Information Systems, Keystone, CO, Aug. 9-12, 2007, 12 pages.

Golbeck et al., "Trust Networks on the Semantic Web", Proceedings of Cooperative Intelligent Agents, 2003, Helsinki, 13 pages.

Heer, et al., "Mining the Structure of User Activity using Cluster Stability". 10 pages, Palo Alto Research Center, Palo Alto, CA USA <<http://jheer.org/files/2002-Lumberjack-SIAM.pdf>.

Katz et al., "Social Network-based Trust in Prioritized Default Logic," Proceedings of the twenty-first National Conference on Artificial Intelligence, 2006, 6 pages.

Max Media, "Pop ups and Contextual advertising". May 27, 2008, 2 pages, <<http://www.maxmediaus.com/pop.html>>.

Mobasher, et al., "Automatic Personalization Based on Web Usage Mining". 20 pages <<http://www.cs.aue.auc.dk/~legind/IR%20course%20Spring%202003/artikler/15e-mobasher99automatic.pdf>>.

Quin Zhu, et al., Unified Representation of Three Dimensional City Models, ISPRS Workshop on Servie and Application of Spatial Data Infrastructure, XXXVI (4/W6), Oct. 14-16, Hangzhou, China, 6 pages.

Tele Atlas Delivers StreetMap Premium for ESRI's ArcGIS Applications, <<http://www.teleatlas.com/WhyTeleAtlas/Investors/IRPressRelease/TA005281>>, Apr. 28, 2008, 2 pages.

The Map Room: Product Details, <<http://astore.amazon.com/maproom-20/detail/B000VRYLU2>>, Apr. 28, 2008.

"The Trust Ontology", Retrieved from the internet Apr. 28, 2008 at http://trust.mindswap.org/trustOnt.shtml, 2 pages.

Volkswagen and Google development revolutionary navigation system, <<http://www.automotoportal.com/article/Volkswagen_and_Google_development_navigation_system>>, Apr. 28, 2008, 3 pages.

Zhang, M2S Maps: Supporting Real-World Navigation with Mobile VR, College of Information Sciences and Technology, The Pennsylvania State University, <<http://zhang.ist.psu.edu/pdf/m2s.pdf>>, last accessed Apr. 28, 2008, 12 pages.

Fredrick Marckini. Contextual Advertising, Part 1 of 2, Oct. 6, 2003. http://www.clickz.com/showPage.html?page=3087311. Last accessed Mar. 20, 2008, 1 page.

N. Hristova, et al. Ad-Me: A Context-Sensitive Advertising System http://www.prism.ucd.ie/publications/pub2001/HriAdme01ii.pdf. Last accessed Mar. 20, 2008, 10 pages.

Non-Final Office Action for U.S. Appl. No. 12/125,514, mailed on May 31, 2011, Gary W. Flake, "Multi-Scale Navigational Visualization," 15 pages.

Non-Final Office Action for U.S. Appl. No. 12/062,302, mailed on Jun. 9, 2011, Gary Flake, "Device Interaction With Combination of Rings," 28 pages.

Office Action for U.S. Appl. No. 12/142,906, mailed on Feb. 13, 2012, Gary W. Flake, "Network of Trust as Married to Multi-scale," 25 pages.

Office Action for U.S. Appl. No. 12/062,302, mailed on Jan. 31, 2012, Gary W. Flake, "Device Interaction With Combination of Rings," 30 pages Office Action for U.S. Appl. No. 12/062,302, mailed on Dec. 1, 2011, Gary W. Flake, "Device Interaction With Combination Of Rings," 31 pages.

Office Action for U.S. Appl. No. 12/125,514, mailed on Oct. 26, 2011, Gary W. Flake, "Multi-Scale Navigational Visualization," 18 pages.
Non-final Office Action for U.S. Appl. No. 12/062,106, mailed on Aug. 18, 2011, Karim Farouki, "Client-Side Composing/Weighting of Ads," 25 pages.
Pollefeys et al., "From Images to 3D Models. How computers can automatically build realistic 3D models from 2D images acquired with a handheld camera," Communications of the ACM, vol. 45, No. 7, Jul. 2002, pp. 51-55 (total of 6 pages with photo cover page).
Snavely et al., "Photo Tourism: Exploring Photo Collections in 3D," ACM, 0730-0301/06/0700-0835, 2006, Association for Computing Machinery, Inc., pp. 835-846.

* cited by examiner

CLIENT-SIDE COMPOSING/WEIGHTING OF ADS

BACKGROUND

Conventionally, web-based ad space, such as web pages or advertisement content included in a webpage are comprised of images or other visual components of a fixed spatial scale, generally based upon settings associated with an output display screen resolution and/or the amount of screen real estate allocated to a viewing application, e.g. the size of a browser that is displayed on the screen to the user.

In addition to finite screen real estate associated with hardware displays, advertisers are further limited by the circumstance that ads are often only secondary content for most any website or page. Accordingly, ad space is generally relegated to small blocks of screen real estate, typically located at the top or along side panels of a web page. While many advertisers have created clever ways to attract a user's attention even with limited amounts of screen real estate, there exists a rational limit to how much information can be supplied by a finite display space under conventional advertising means, whereas actual transactions—the primary goal of the advertiser—usually necessitate a much greater amount of information be provided to the user.

Accordingly, most forms of web-based advertising rely almost exclusively on a click-through advertising model or mechanism in which a fixed spatial scale image is employed to encourage a potential customer to click the ad, whereby the potential customer can then be routed via hyperlink to more extensive amounts of information pertaining to the ad. Furthermore, ads are typically pre-identified and placed in predetermined locations on websites, web pages, web space, and the like.

SUMMARY

The following presents a simplified summary of the innovation in order to provide a basic understanding of some aspects described herein. This summary is not an extensive overview of the claimed subject matter. It is intended to neither identify key or critical elements of the claimed subject matter nor delineate the scope of the subject innovation. Its sole purpose is to present some concepts of the claimed subject matter in a simplified form as a prelude to the more detailed description that is presented later.

The subject innovation relates to systems and/or methods that facilitate identifying relevant ads associated with browsed content of a user. Typically, advertisements are placed on web pages in a pre-determined location with a pre-determined ad. For example, a banner ad on a sports site will have a particular location in which an advertiser will insert a specific ad (e.g., a running shoe sale ad on the sports site). The innovation relates to dynamically displaying ads as a function of content associated with two or more concurrent and on-going browsing sessions. A browser or a display engine can explore data and/or numerous web sites which can be evaluated in order to display advertisements. In particular, an evaluator can identify a correlation between content associated with a plurality of browsing sessions or browsing history, wherein an ad selector can incorporate advertisements into such browsing sessions in accordance to such correlation. In general, the claimed subject matter can evaluate any data displayed on a user's screen in order to generate appropriate advertisements.

In accordance with another aspect of the subject innovation, a user can opt-in to receive packaged discounts or sales. A group solicitor can receive an acceptance from a user in which particular advertisements can be communicated to group members based on user activity. For example, upon acceptance (e.g., enable companies to view such private information), opt-in opportunities can be based on the browsing session of a user. Moreover, the innovation includes a targeted co-op ad discount (e.g., via a consumer power component) that offers an opportunity or discount for members of a select group. The targeted co-op, if joined, can further provide consumer power (e.g., based on buying in bulk, etc.) in negotiations for discounts and the like while protecting identity. This targeted co-op ad discount group can further entice membership or users to join by using a revenue sharing technique. In other aspects of the claimed subject matter, methods are provided that facilitate evaluating two or more browsing sessions in order to identify at least one corresponding advertisement to display within such browsing session.

The following description and the annexed drawings set forth in detail certain illustrative aspects of the claimed subject matter. These aspects are indicative, however, of but a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

DETAILED DESCRIPTION

Figure 1:
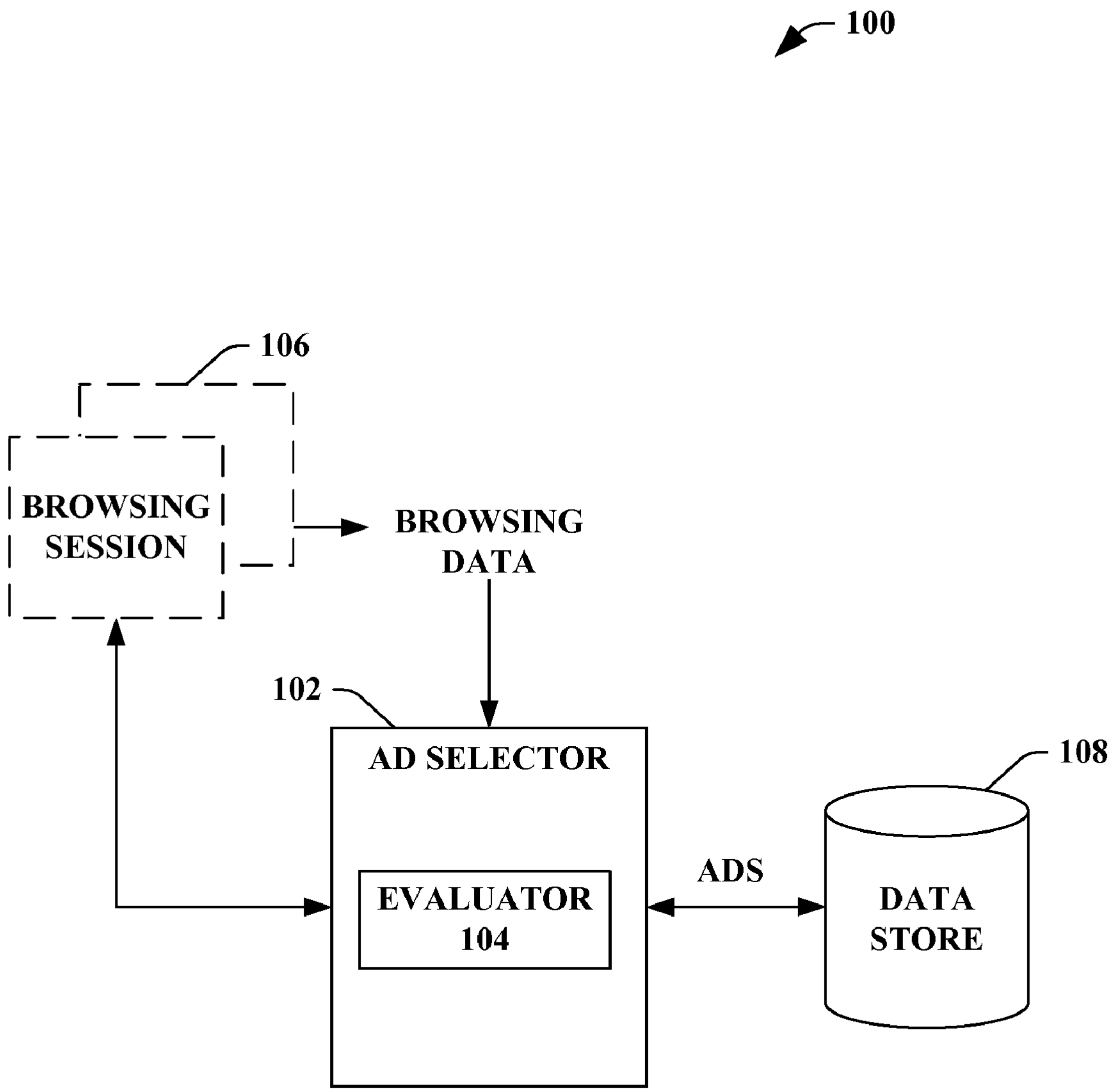
FIG. 1 illustrates a block diagram of an exemplary system that facilitates evaluating two or more browsing sessions in order to seamlessly incorporate an ad relating thereto.

The claimed subject matter is described with reference to the drawings, wherein like reference numerals are used to refer to like elements throughout. In the following description, for purposes of explanation, numerous specific details are set forth in order to provide a thorough understanding of the subject innovation. It may be evident, however, that the claimed subject matter may be practiced without these specific details. In other instances, well-known structures and devices are shown in block diagram form in order to facilitate describing the subject innovation.

As utilized herein, terms "component," "system," "session," "evaluator," "selector," "store," "engine," "privatizer," "solicitor," and the like are intended to refer to a computer-related entity, either hardware, software (e.g., in execution), and/or firmware. For example, a component can be a process running on a processor, a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the claimed subject matter. Moreover, the word "exemplary" is used herein to mean serving as an example, instance, or illustration. Any aspect or design described herein as "exemplary" is not necessarily to be construed as preferred or advantageous over other aspects or designs.

Now turning to the figures, FIG. 1 illustrates a system 100 that facilitates evaluating two or more browsing sessions in order to seamlessly incorporate an ad relating thereto. The system 100 can include an ad selector 102 that can automatically populate at least one browsing session 106 with an advertisement based upon an evaluator 104 examining content related to two or more concurrent browsing sessions 106. In particular, the ad selector 102 can receive a portion of browsing data associated with two or more browsing sessions 106 in which the evaluator 104 can analyze such browsing sessions 106 to identify a correlating content or context. It is to be appreciated that the ad selector 102 can receive the portion of browsing data from two or more browsing sessions 106 that are concurrently being utilized at the substantially same moment in time. In other words, browsing data from two or more on-going browsing session 106 can be evaluated in order to generate a content or context related therewith. Based at least in part upon the content or context identified by the evaluator 104 and/or the ad selector 102, at least one ad can be seamlessly incorporated or directed to one or more browsing sessions 106. This, in turn, enables relevant advertisements to be presented to a user during a browsing session.

For example, a user can browse data utilizing any suitable browsing component or application in which multiple browsing sessions can be concurrently employed. Thus, a first window can browse a first data set, a second window can include a second data set that is explored, a third window can include a third data set that is displayed, and so on and so forth. The content and/or data related to each browsing session (e.g., first window, second window, third window, etc.) can be evaluated to identify a correlation or similarity to which a context can be ascertained. For instance, the browsing data (e.g., first data set, second data set, third data set, etc.) can be examined to determine a corresponding or common context. Based on such corresponding context, an ad can be displayed to the user. In other words, an ad that is relevant to the user-browsed content can be presented rather than pre-determined and unrelated ads. Since the ad is generated and selected based on the browsed data aggregated by the ad selector 102, the user's browsing session can include relevant ads with a more likelihood of activation or appealing to the user.

The system 100 can further include a data store 108 that can include any suitable data related to the ad selector 102, the evaluator 104, the browsing sessions 106, an advertisement, a portion of browsing data, etc. For example, the data store 108 can include, but not limited to including, advertisements, identified content, identified context related to browsing sessions, user profiles, user preferences, user defined settings, advertisement data (e.g., type of ads, categories of ads, recommended target audience for ads, etc.), click-through data, activation data for ads, etc. For example, the ad selector 102 can incorporate an ad from the data store 108 based on a correlation between such ad and the ascertained content or context from the browsing sessions 106. It is to be appreciated that the data store 108 can be local, remote, associated in a cloud (e.g., a collection of resources that can be remotely accessed by a user, etc.), and/or any suitable combination thereof.

It is to be appreciated that the data store 108 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 108 of the subject systems and methods is intended to comprise, without being limited to, these and any other suitable types of memory. In addition, it is to be appreciated that the data store 108 can be a server, a database, a hard drive, a pen drive, an external hard drive, a portable hard drive, and the like.

In addition, the system 100 can include any suitable and/or necessary interface component (not shown), which provides various adapters, connectors, channels, communication paths, etc. to integrate the ad selector into virtually any operating and/or database system(s) and/or with one another. In addition, the interface component can provide various adapters, connectors, channels, communication paths, etc., that provide for interaction with the ad selector 102, the evaluator 104, the browsing session 106, the data store 108, and any other device and/or component associated with the system 100.

Figure 2:
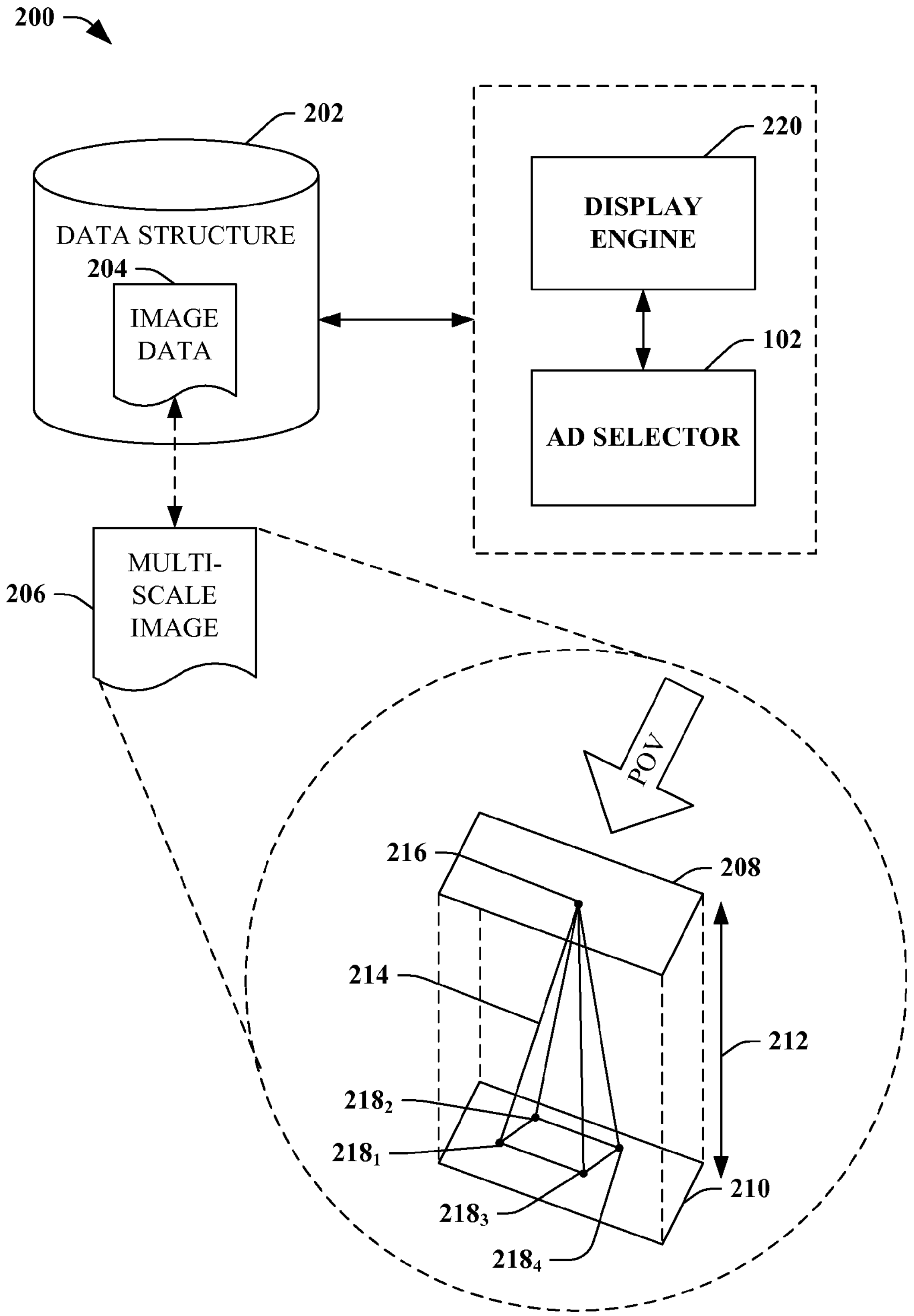
FIG. 2 illustrates a block diagram of an exemplary system that facilitates displaying an advertisement based on a browsing session and two or more view levels associated with a portion of image data.

FIG. 2 illustrates a system 200 that facilitates displaying an advertisement based on a browsing session and two or more view levels associated with a portion of image data. Generally, system 200 can include a data structure 202 with image data 204 that can represent, define, and/or characterize computer displayable multiscale image 206, wherein a display engine 220 can access and/or interact with at least one of the data structure 202 or the image data 204 (e.g., the image data 204 can be any suitable data that is viewable, displayable, and/or browse able). In particular, image data 204 can include two or more substantially parallel planes of view (e.g., layers, scales, etc.) that can be alternatively displayable, as encoded in image data 204 of data structure 202. For example, image 206 can include first plane 208 and second plane 210, as well as virtually any number of additional planes of view, any of which can be displayable and/or viewed based upon a level of zoom 212. For instance, planes 208, 210 can each include content, such as on the upper surfaces that can be viewable in an orthographic fashion. At a higher level of zoom 212, first plane 208 can be viewable, while at a lower level zoom 212 at least a portion of second plane 210 can replace on an output device what was previously viewable.

Moreover, planes 208, 210, et al., can be related by pyramidal volume 214 such that, e.g., any given pixel in first plane 208 can be related to four particular pixels in second plane 210. It should be appreciated that the indicated drawing is merely exemplary, as first plane 208 need not necessarily be the top-most plane (e.g., that which is viewable at the highest level of zoom 212), and, likewise, second plane 210 need not necessarily be the bottom-most plane (e.g., that which is viewable at the lowest level of zoom 212). Moreover, it is further not strictly necessary that first plane 208 and second plane 210 be direct neighbors, as other planes of view (e.g., at interim levels of zoom 212) can exist in between, yet even in such cases the relationship defined by pyramidal volume 214 can still exist. For example, each pixel in one plane of view can be related to four pixels in the subsequent next lower plane of view, and to 216 pixels in the next subsequent plane of view, and so on. Accordingly, the number of pixels included in pyramidal volume at a given level of zoom, l, can be described as $p=4^l$, where l is an integer index of the planes of view and where l is greater than or equal to zero. It should be appreciated that p can be, in some cases, greater than a number of pixels allocated to image 206 (or a layer thereof) by a display device (not shown) such as when the display device allocates a relatively small number of pixels to image 206 with other content subsuming the remainder or when the limits of physical pixels available for the display device or a viewable area is reached. In these or other cases, p can be truncated or pixels described by p can become viewable by way of panning image 206 at a current level of zoom 212.

However, in order to provide a concrete illustration, first plane 208 can be thought of as a top-most plane of view (e.g., l=0) and second plane 210 can be thought of as the next sequential level of zoom 212 (e.g., l=1), while appreciating that other planes of view can exist below second plane 210, all of which can be related by pyramidal volume 214. Thus, a given pixel in first plane 208, say, pixel 216, can by way of a pyramidal projection be related to pixels $\mathbf{218_1}$-$\mathbf{218_4}$ in second plane 210. The relationship between pixels included in pyramidal volume 214 can be such that content associated with pixels $\mathbf{218_1}$-$\mathbf{218_4}$ can be dependent upon content associated with pixel 216 and/or vice versa. It should be appreciated that each pixel in first plane 208 can be associated with four unique pixels in second plane 210 such that an independent and unique pyramidal volume can exist for each pixel in first plane 208. All or portions of planes 208, 210 can be displayed by, e.g. a physical display device with a static number of physical pixels, e.g., the number of pixels a physical display device provides for the region of the display that displays image 206 and/or planes 208, 210. Thus, physical pixels allocated to one or more planes of view may not change with changing levels of zoom 212; however, in a logical or structural sense (e.g., data included in image data 204) each success lower level of zoom 212 can include a plane of view with four times as many pixels as the previous plane of view.

The ad selector 102 can further examine and/or analyze the image data 204 and/or the various planes of view navigated associated with the multiscale image 206. Based on such analysis and/or examination, the ad selector 102 can incorporate an advertisement to push to the user during such navigation or browsing session. For example, browsing data that includes the image data 204 including multiscale image 206 can enable various planes of view and/or levels of data to be explored. Based on such exploration within the pyramidal volumes of data, context of such browsing session can be generated to allow a relevant ad to be located and displayed. Moreover, it is to be appreciated that the browsing session can be associated with any suitable image data 204 (having multiscale image with pyramidal volumes of data at various view levels or planes of view) in at least one of a 2-dimensional (2D) environment or a 3-dimensional (3D) environment. In other words, it is to be appreciated that the ad selector 102 can be utilized with image data having pyramidal volumes of data as well as single-plane data as conventionally browsed on the Internet, a network, a wireless network, and the like.

Figure 3:
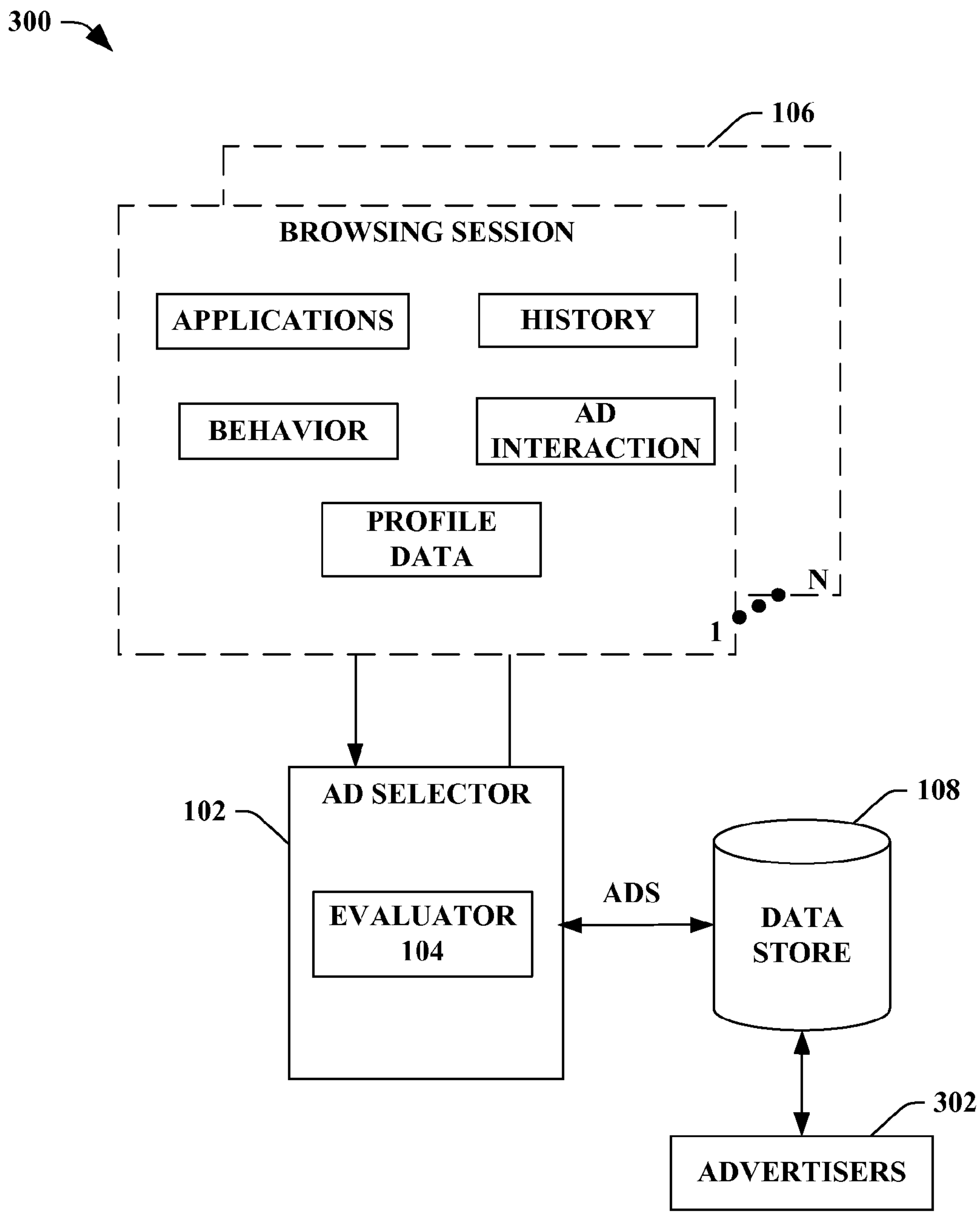
FIG. 3 illustrates a block diagram of an exemplary system that facilitates examining data related to browsing sessions in order to identify a context to which a relating ad can be automatically and directly displayed to a user.

FIG. 3 illustrates a system 300 that facilitates examining data related to browsing sessions in order to identify a context to which a related ad can be automatically and directly displayed to a user. The system 300 can include the ad selector 102 that enables a smart selection or incorporation of ads based on an identified relevancy to one or more browsing sessions 106. Generally, the smart selection allows a browsing session to be embedded with ads that relate or correspond to the content or a generalized context of the concurrent browsing sessions 106. It is to be appreciated that the ad selector 102 and/or the evaluator 104 can analyze any suitable number of browsing sessions 106 such as browsing session 1 to browsing session N, where N is a positive integer.

The ad selector 102 can evaluate any suitable data associated with the two or more concurrent browsing sessions 106. For example, the ad selector 102 can evaluate one or more executing applications associated with the browsing session 106. Thus, application data can be evaluated in order to identify relevant ads for such browsing session. The application data can be, but is not limited to, version data, type of application, frequency of use, copyright data, manufacturer, size of the application, etc. In another example, the ad selector can analyze behavior within the browsing session such as, but not limited to, click frequency, scroll frequency, highlighting, inputs, input device location (e.g., mouse cursor, etc.), etc. In still another example, the ad selector 102 and/or the evaluator 104 can examine usage of the browsing session 106. For instance, the system 300 can evaluate information such as, but not limited to, duration of browsing on a particular portion of data, explicit tagging (e.g., adding to favorites, bookmarks, etc.), frequency of visit/browsing, data feed subscription (e.g., RSS feeds, etc.), subscriptions, newsletters, implicit user data (e.g., passive monitoring of browsing activity, etc.), explicit user data (e.g., search strings, contextual data, etc.), profile data, user settings, user preferences, user specific settings for a web page (e.g., personalized web sites, etc.), etc. In addition, the browsing history related to a particular user can be analyzed in order to provide context for ad selection. Furthermore, interaction with at least one ad can be evaluated in order to create a model representative of a user's preference for the content, context, or type of advertisements. For example, the system 300 can infer that picture advertisements are more appealing to a user based on the user's interaction with picture ads more frequent than non-picture ads.

The system can further include advertisers 302. The advertisers 302 can manage the advertisements included within the data store 108. In particular, the advertisers 302 can manage such ads with operations such as adding ads, deleting ads, uploading ads, storing ads, editing ads, etc. It is to be appreciated that the advertisers 302 can be any suitable entity that advertises with computer displaying data and there can be any suitable number of advertisers 302 that populate the data store 108. Moreover, the advertisers 302 can approve and/or monitor the type of advertisements that are automatically incorporated into browsing sessions 106 based on relevancy. In one particular example, an advertiser can include a series of advertisements for a particular product, wherein each ad can be related to a particular topic or context. Thus, an ad for a widget can include a plurality of ads such as a first ad with a sports angle/approach, a second ad with a sophisticated/educated angle/approach, and a third ad with a youth angle/approach. In other words, the advertisers 302 can provide canned or targeted ads that relate to particular topics, contexts, and the like. In still another example, the advertisers 302 can evaluate the type of context or topics to which the browsing sessions 106 relate. Based on leveraging such data, the advertisers 302 can create or employ more ads within such context or topics based on their having a high popularity and/or correlation with the browsing sessions 106.

In addition, the system 300 can dynamically construct an advertisement to incorporate into one or more browsing sessions 106. For example, data within a browsing session can be viewable by a user by way of, e.g., a content or web browser. The user can be, e.g., a web user, a consumer advertising content, and/or an individual or entity visually exposed to such data within the browsing session. Hence, in an aspect of the claimed subject matter, the browsing session 106 can encompass substantially all viewable content on a webpage.

Moreover, the ad selector 102 can dynamically construct advertisements based upon a contextual input in addition to evaluating two or more concurrent browsing sessions 106. The contextual input can be provided by the user and can be based upon, e.g., a search string or other contextual information such as keywords, metadata, a profile associated with the user (e.g., demographics, transaction history, preferences . . . ), and so on. Appreciably, the ad selector 102 can populate the browsing session 106 with quite dissimilar advertisements when a search string (or other contextual information) is "cars" as opposed to "widgets." Similarly, the contextual input can be based upon search results. Accordingly, given that the ad selector 102 can dynamically construct and/or incorporate ads on the fly, conventional forms of advertisements relating to contextual information can be augmented or replaced entirely by the system 300, potentially without the need to dramatically change what contextual information is utilized or obtained or necessarily how content is selected.

Figure 4:
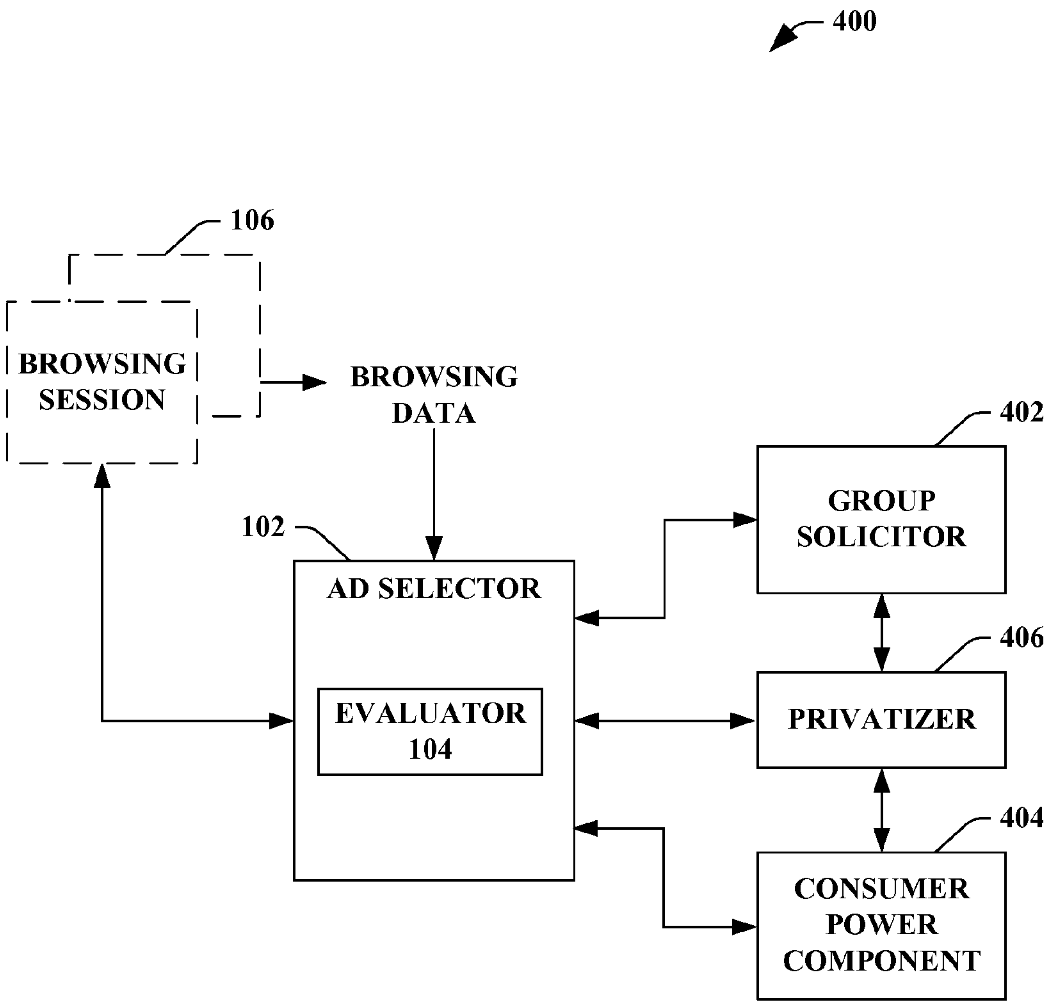
FIG. 4 illustrates a block diagram of an exemplary system that facilitates leveraging groups of users in accordance with the claimed subject matter.

FIG. 4 illustrates a system 400 that facilitates leveraging groups of users in accordance with the claimed subject matter. The system 400 can include the ad selector 102 that can employ the evaluator 104 to dynamically examine two or more browsing sessions 106 in order to identify a common theme, topic, content, context, and the like. Such identified theme, topic, content, context, and the like can be indicative of interests for the user or entity initiating the browsing sessions 106. Thus, an ad related to such interests can be located and incorporated or displayed into at least one of the browsing sessions. In other words, advertisements can be presented to a user during a data browsing session in which such advertisements are relevant to such user's interests.

The system 400 can further include a group solicitor 402 that enables user subscription to receive particular offers, ads, discounts, sales, and the like in regards to goods or services. For example, the group solicitor 402 can allow a user to subscribe to a receive solicitations from manufacturer, producer or service provider based on his or her liking. For example, a questionnaire or survey can be utilized by a user to identify goods or services to which they are interested in receiving information (e.g., ads, discounts, sales, offers, etc.). In other words, the group solicitor 402 can allow a user to define and select solicitations to receive or the solicitations can be offered based on evaluation of the browsing sessions 106. It is to be appreciated that the user can opt-in to such group solicitor 402 in order to receive package discounts or sales. Upon acceptance, such opt-in opportunities can be based on the evaluation of the two or more concurrent browsing sessions 106. For example, based on evaluating two or more browsing sessions 106, a user can be offered to subscribe to a "Brand A" solicitation since such browsing sessions correspond to "Brand A." With this subscription, the user can receive offers, ads, discounts, sales, and the like to goods and/or services related to "Brand A."

The system 400 can further include a consumer power component 404 that enables a collection of consumers or users interested in a common good or service to be aggregated in order to provide an increase in buying power, wherein such buying power can justify a discount or price reduction. For instance, the consumer power component 404 can provide a targeted co-op ad discount that offers an opportunity or discount for members of a select group. In another example, the consumer power component 404 can encourage membership or users with a revenue sharing technique. Thus, an amount of revenue saved or received in connection with the buying power from the consumer power component 404 group can be distributed to the members (e.g., equally, based on a percentage of purchases, etc.).

The system 400 can further include the privatizer 406. The privatizer 406 can protect private data or information related to a user in connection with group subscriptions or opt-ins for the group solicitor 402 and/or the consumer power component 404. For example, the anonymity of a user can be protected and ensured when joining or utilizing such groups. Thus, private information or data can be secure, wherein such private information or data can be, but is not limited to, credit card information, account information, user name, passwords, personal information (e.g., address, name, date of birth, phone number, social security number, income, email address, zip code, work affiliations, etc.), age, height, weight, personal tasks, etc. In general, the privatizer 406 can protect any suitable data or information to which a user identifies as private or not to be public.

Figure 5:
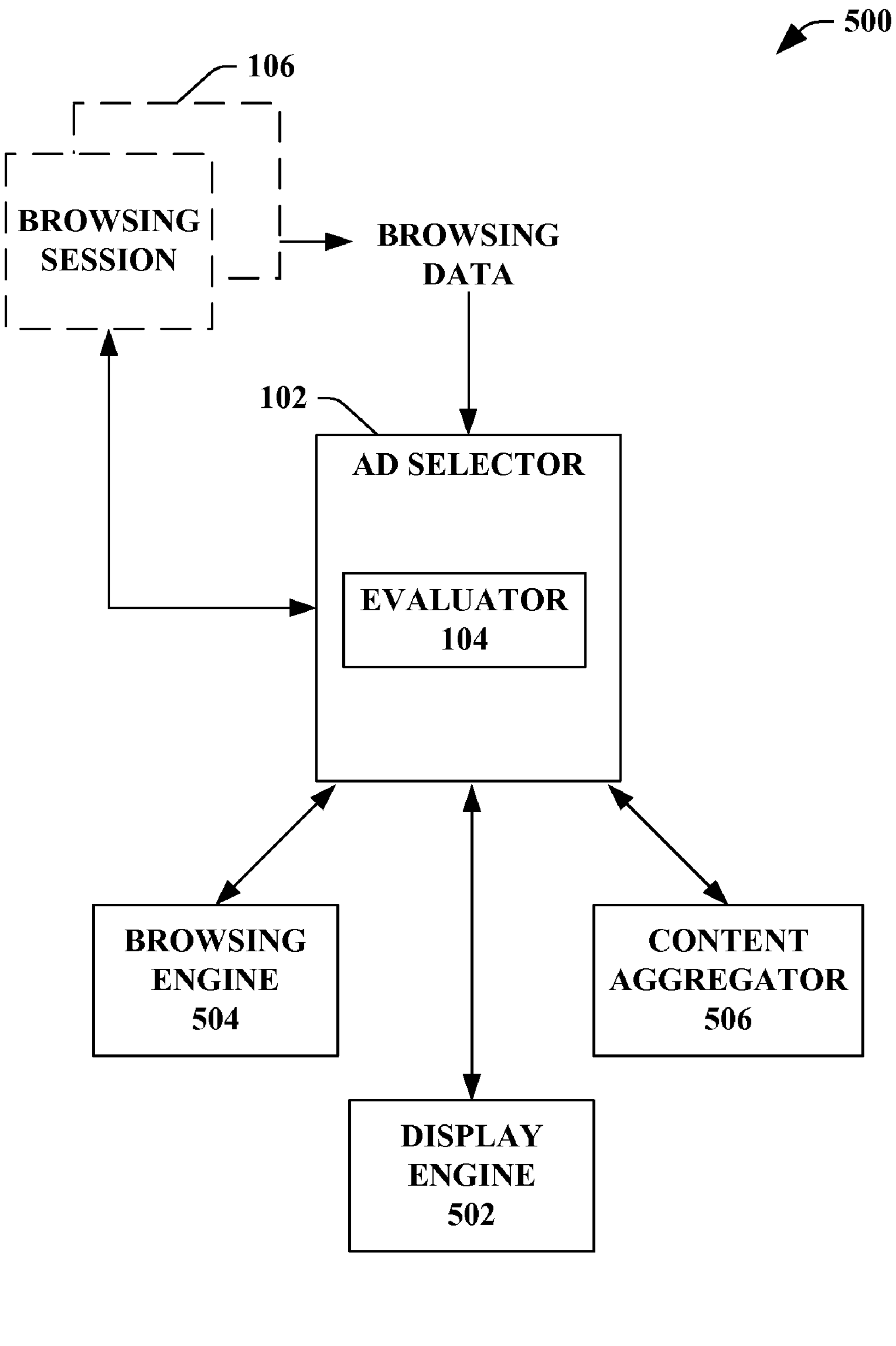
FIG. 5 illustrates a block diagram of exemplary system that facilitates enhancing implementation of ad placement/generation techniques described herein with a display technique, a browse technique, and/or a virtual environment technique.

FIG. 5 illustrates a block diagram of exemplary system that facilitates enhancing implementation of ad placement/generation techniques described herein with a display technique, a browse technique, and/or a virtual environment technique. The system 500 can include the ad selector 102, the evaluator 104, and the two or more browsing sessions 106 as described above. The system 500 can further include a display engine 502 that enables seamless pan and/or zoom interaction with any suitable displayed data, wherein such data can include multiple scales or views and one or more resolutions associated therewith. In other words, the display engine 502 can manipulate an initial default view for displayed data by enabling zooming (e.g., zoom in, zoom out, etc.) and/or panning (e.g., pan up, pan down, pan right, pan left, etc.) in which such zoomed or panned views can include various resolution qualities. The display engine 502 enables visual information to be smoothly browsed regardless of the amount of data involved or bandwidth of a network. Moreover, the display engine 502 can be employed with any suitable display or screen (e.g., portable device, cellular device, monitor, plasma television, etc.). The display engine 502 can further provide at least one of the following benefits or enhancements: 1) speed of navigation can be independent of size or number of objects (e.g., data); 2) performance can depend on a ratio of bandwidth to pixels on a screen or display; 3) transitions between views can be smooth; and 4) scaling is near perfect and rapid for screens of any resolution.

For example, an image can be viewed at a default view with a specific resolution. Yet, the display engine 502 can allow the image to be zoomed and/or panned at multiple views or scales (in comparison to the default view) with various resolutions. Thus, a user can zoom in on a portion of the image to get a magnified view at an equal or higher resolution. By enabling the image to be zoomed and/or panned, the image can include virtually limitless space or volume that can be viewed or explored at various scales, levels, or views with each including one or more resolutions. In other words, an image can be viewed at a more granular level while maintaining resolution with smooth transitions independent of pan, zoom, etc. Moreover, a first view may not expose portions of information or data on the image until zoomed or panned upon with the display engine 502.

A browsing engine 504 can also be included with the system 500. The browsing engine 504 can leverage the display engine 502 to implement seamless and smooth panning and/or zooming for any suitable data browsed in connection with at least one of the Internet, a network, a server, a website, a web page, and the like. It is to be appreciated that the browsing engine 504 can be a stand-alone component, incorporated into a browser, utilized with in combination with a browser (e.g., legacy browser via patch or firmware update, software, hardware, etc.), and/or any suitable combination thereof. For example, the browsing engine 504 can be incorporate Internet browsing capabilities such as seamless panning and/or zooming to an existing browser. For example, the browsing engine 504 can leverage the display engine 502 in order to provide enhanced browsing with seamless zoom and/or pan on a website, wherein various scales or views can be exposed by smooth zooming and/or panning.

The system 500 can further include a content aggregator 506 that can collect a plurality of two dimensional (2D) content (e.g., media data, images, video, photographs, metadata, trade cards, etc.) to create a three dimensional (3D) virtual environment that can be explored (e.g., displaying each image and perspective point). In order to provide a complete 3D environment to a user within the virtual environment, authentic views (e.g., pure views from images) are combined with synthetic views (e.g., interpolations between content such as a blend projected onto the 3D model). For instance, the content aggregator 506 can aggregate a large collection of photos of a place or an object, analyze such photos for similarities, and display such photos in a reconstructed 3D space, depicting how each photo relates to the next. It is to be appreciated that the collected content can be from various locations (e.g., the Internet, local data, remote data, server, network, wirelessly collected data, etc.). For instance, large collections of content (e.g., gigabytes, etc.) can be accessed quickly (e.g., seconds, etc.) in order to view a scene from virtually any angle or perspective. In another example, the content aggregator 506 can identify substantially similar content and zoom in to enlarge and focus on a small detail. The content aggregator 506 can provide at least one of the following: 1) walk or fly through a scene to see content from various angles; 2) seamlessly zoom in or out of content independent of resolution (e.g., megapixels, gigapixels, etc.); 3) locate where content was captured in relation to other content; 4) locate similar content to currently viewed content; and 5) communicate a collection or a particular view of content to an entity (e.g., user, machine, device, component, etc.).

It is to be appreciated that any suitable data within the browsing session 106 and/or interacted with utilizing at least one of the display engine 502, the browsing engine 504, and/or the content aggregator 506 can be examined, analyzed, evaluated, and the like in order to identify a commonality, context, and/or generalized topic to which relevant ads can be displayed. For example, the data or view levels seamlessly navigated utilizing the display engine 502 can be evaluated in order to generalize a context that can be used to identify relevant ads to display within such navigation. In another example, the browsing engine 504 can be leveraged in which explored data can be evaluated in order to identify relevant or corresponding ads. In still another example, data exploration (e.g., viewed data, perspective of such viewed data, etc.) within a 3D environment created from 2D content can be evaluated in order to populate such environment with relevant ads.

Figure 6:
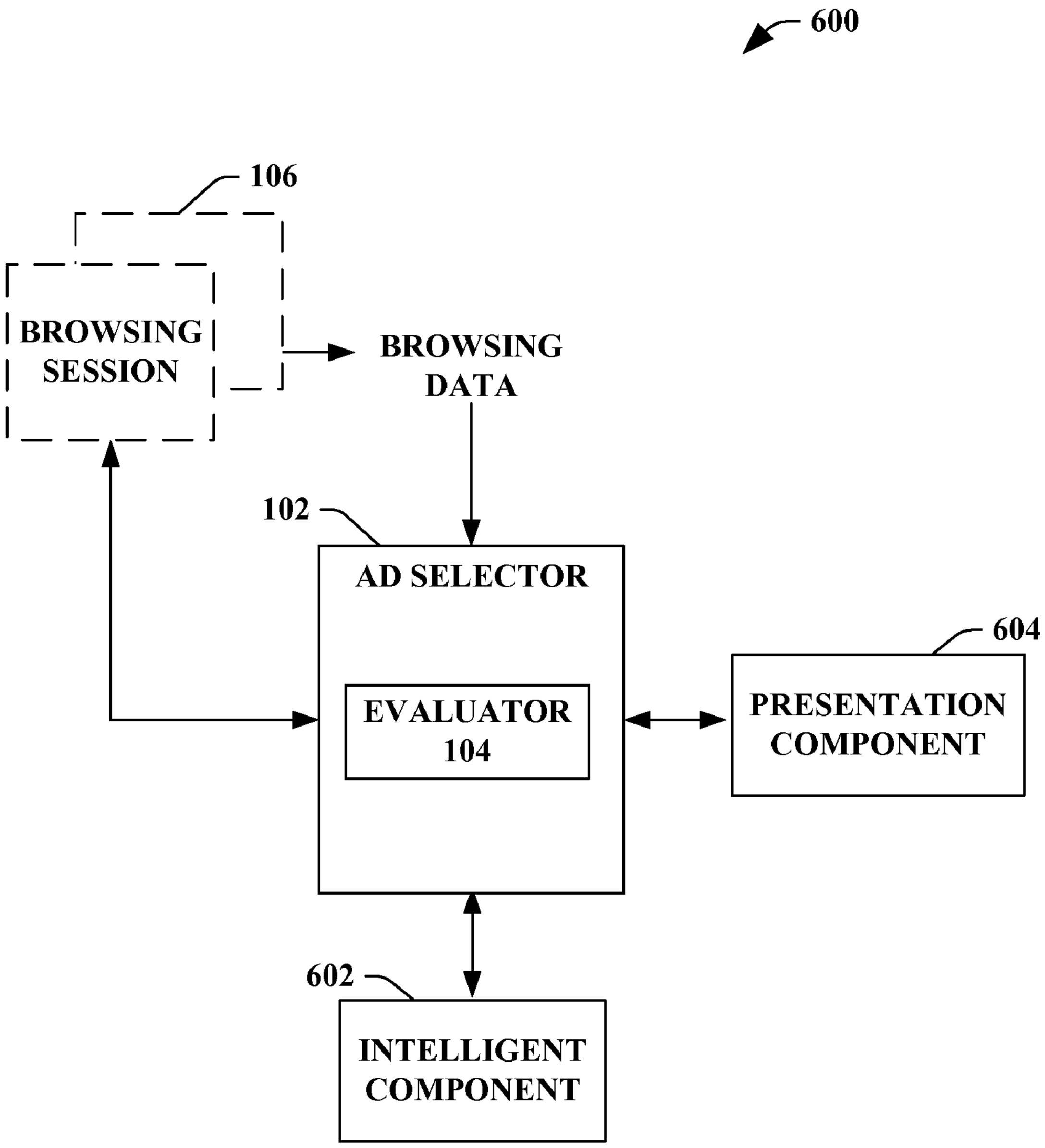
FIG. 6 illustrates a block diagram of an exemplary system that facilitates evaluating browsing session related to a user and identifying relevant ads for the user.

FIG. 6 illustrates a system 600 that employs intelligence to facilitate evaluating browsing session related to a user and identifying relevant ads for the user. The system 600 can include the ad selector 102, the evaluator 104, and the two or more browsing sessions 106 can be substantially similar to respective components, selectors, evaluators, and sessions described in previous figures. The system 600 further includes an intelligent component 602. The intelligent component 602 can be utilized by the ad selector 102 and/or the evaluator 104 to facilitate automatically identifying a relevant advertisement to push to a user during a browsing session based upon evaluating two or more concurrent data browsing sessions. For example, the intelligent component 602 can infer advertisements to populate into the browsing session, context related to two or more browsing sessions, user preferences, implicit interests related to a user, interests for a user, types of preferred advertisements, user preference in terms of an ad angle or approach, browsing sessions and/or data to evaluate, weight associated with a content/context, etc.

The intelligent component 602 can employ value of information (VOI) computation in order to identify advertisements to populate into at least one browsing session. For instance, by utilizing VOI computation, the most ideal and/or appropriate advertisements for a particular user can be determined. Moreover, it is to be understood that the intelligent component 602 can provide for reasoning about or infer states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification (explicitly and/or implicitly trained) schemes and/or systems (e.g., support vector machines, neural networks, expert systems, Bayesian belief networks, fuzzy logic, data fusion engines . . . ) can be employed in connection with performing automatic and/or inferred action in connection with the claimed subject matter.

A classifier is a function that maps an input attribute vector, x=(x1, x2, x3, x4, xn), to a confidence that the input belongs to a class, that is, f(x)=confidence(class). Such classification can employ a probabilistic and/or statistical-based analysis (e.g., factoring into the analysis utilities and costs) to prognose or infer an action that a user desires to be automatically performed. A support vector machine (SVM) is an example of a classifier that can be employed. The SVM operates by finding a hypersurface in the space of possible inputs, which hypersurface attempts to split the triggering criteria from the non-triggering events. Intuitively, this makes the classification correct for testing data that is near, but not identical to training data. Other directed and undirected model classification approaches include, e.g., näive Bayes, Bayesian networks, decision trees, neural networks, fuzzy logic models, and probabilistic classification models providing different patterns of independence can be employed. Classification as used herein also is inclusive of statistical regression that is utilized to develop models of priority.

The ad selector 102 can further utilize a presentation component 604 that provides various types of user interfaces to facilitate interaction between a user and any component coupled to the ad selector 102. As depicted, the presentation component 604 is a separate entity that can be utilized with the automatic ad selector 102. However, it is to be appreciated that the presentation component 604 and/or similar view components can be incorporated into the ad selector 102 and/or a stand-alone unit. The presentation component 604 can provide one or more graphical user interfaces (GUIs), command line interfaces, and the like. For example, a GUI can be rendered that provides a user with a region or means to load, import, read, etc., data, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with one or more of the components coupled and/or incorporated into the ad selector component 102.

The user can also interact with the regions to select and provide information via various devices such as a mouse, a roller ball, a touchpad, a keypad, a keyboard, a touch screen, a pen and/or voice activation, a body motion detection, for example. Typically, a mechanism such as a push button or the enter key on the keyboard can be employed subsequent entering the information in order to initiate the search. However, it is to be appreciated that the claimed subject matter is not so limited. For example, merely highlighting a check box can initiate information conveyance. In another example, a command line interface can be employed. For example, the command line interface can prompt (e.g., via a text message on a display and an audio tone) the user for information via providing a text message. The user can then provide suitable information, such as alpha-numeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, EGA, VGA, SVGA, etc.) with limited graphic support, and/or low bandwidth communication channels.

Figure 7:
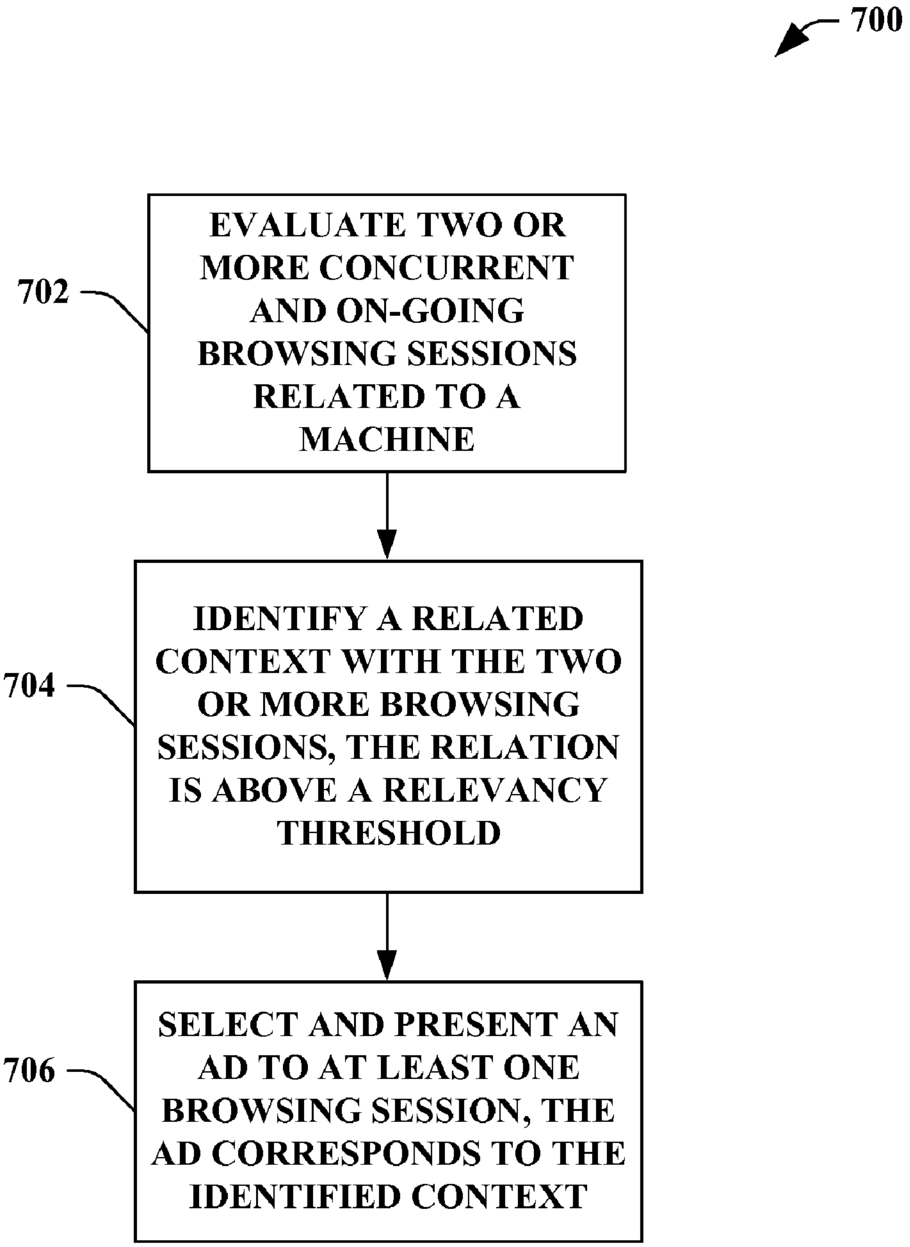
FIG. 7 illustrates an exemplary methodology for evaluating two or more browsing sessions in order to seamlessly incorporate an ad relating thereto.
Figure 8:
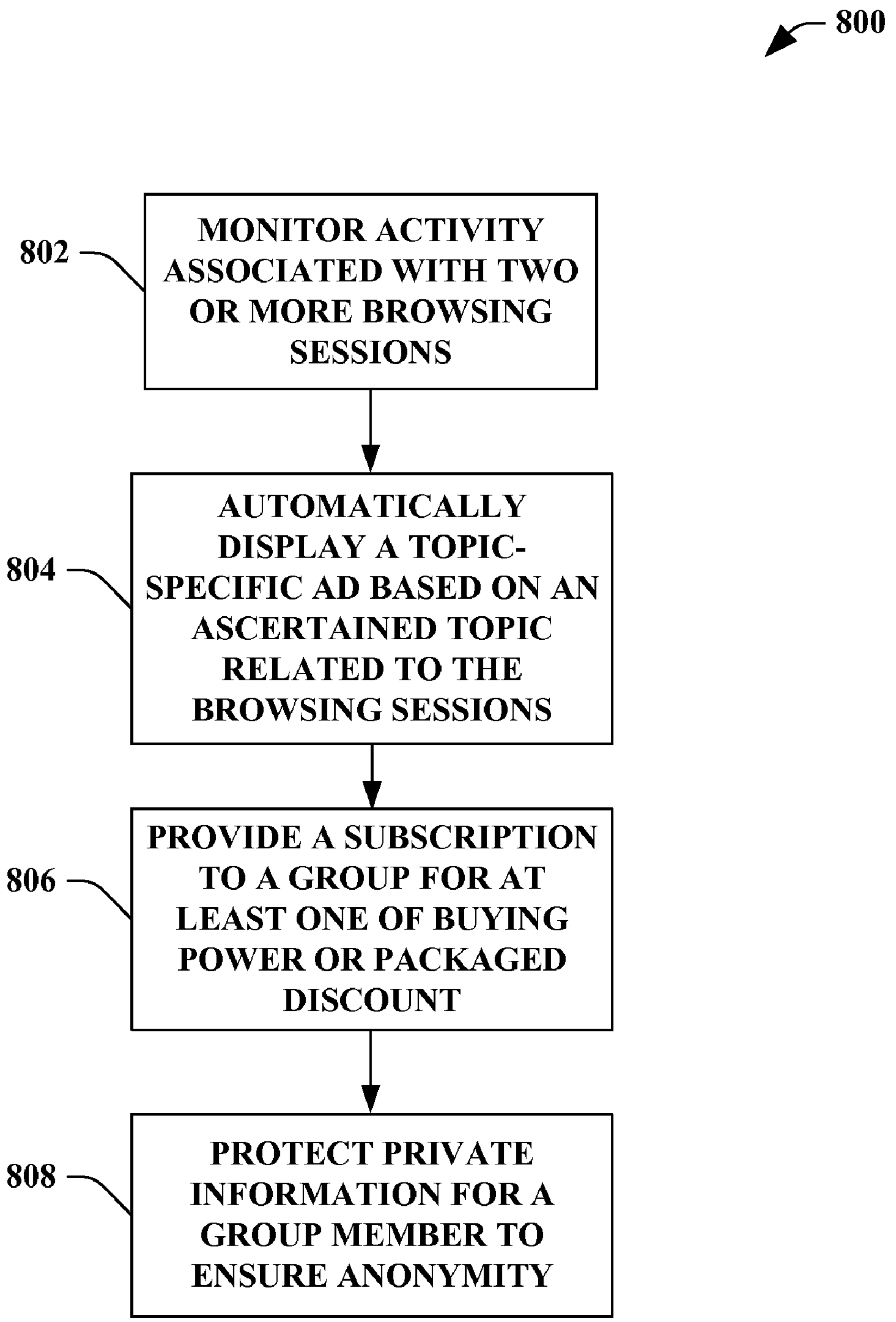
FIG. 8 illustrates an exemplary methodology that facilitates examining data related to browsing sessions in order to identify a context to which a relating ad can be automatically and directly displayed to a user.

FIGS. 7-8 illustrate methodologies and/or flow diagrams in accordance with the claimed subject matter. For simplicity of explanation, the methodologies are depicted and described as a series of acts. It is to be understood and appreciated that the subject innovation is not limited by the acts illustrated and/or by the order of acts. For example acts can occur in various orders and/or concurrently, and with other acts not presented and described herein. Furthermore, not all illustrated acts may be required to implement the methodologies in accordance with the claimed subject matter. In addition, those skilled in the art will understand and appreciate that the methodologies could alternatively be represented as a series of interrelated states via a state diagram or events. Additionally, it should be further appreciated that the methodologies disclosed hereinafter and throughout this specification are capable of being stored on an article of manufacture to facilitate transporting and transferring such methodologies to computers. The term article of manufacture, as used herein, is intended to encompass a computer program accessible from any computer-readable device, carrier, or media.

FIG. 7 illustrates a method 700 that facilitates evaluating two or more browsing sessions in order to seamlessly incorporate an ad relating thereto. The method 700 enables an ad to be automatically and directly presented to a user in which the ad is relevant to an interest or context of the user's browsing session. At reference numeral 702, two or more concurrent and on-going browsing sessions related to a machine can be evaluated. In particular, the browsing sessions can be any suitable application or task in which data is browsed with a machine, wherein the machine can be, but is not limited to being, a computer, a desktop computer, a laptop, a smartphone, a portable digital assistant (PDA), a web browsing device, a mobile device, a hand-held, a portable device, a portable gaming device, a gaming console, a cellular device, etc.

At reference numeral 704, a related context with the two or more browsing sessions can be identified, wherein the relation is equal to or above a relevancy threshold. It is to be appreciated that examination to identify the context associated with the browsing sessions can be performed with any suitable comparison technique such as, but not limited to, a cosine similarity or a KL-divergence. Moreover, it is to be appreciated that the relevance threshold can be a default value, a user-defined value, a dynamically changing value based on amount of identified context, etc. At reference numeral 706, an ad can be selected and presented to at least one browsing session, wherein the ad corresponds to the identified context. In other words, based on evaluating the browsing sessions, a context can be identified to which a related ad can be presented to the browsing session. Thus, ads can be displayed that relate or correlate to the user's browsing session rather than having rigid and pre-defined ads within a browsing session.

FIG. 8 illustrates a method 800 for examining data related to browsing sessions in order to identify a context to which a relating ad can be automatically and directly displayed to a user. At reference numeral 802, activity associated with two or more browsing sessions can be monitored. For instance, the activity can be any suitable data browsing associated with a network, the Internet, a local area network (LAN), a wireless network, etc. Moreover, the activity can be related to navigation with a portion of image data having a multiscale image that includes pyramidal volume with two or more substantially parallel views or planes. In addition, the activity can be related to navigation or exploration within a 3D virtual environment comprised of a plurality of 2D content.

At reference numeral 804, a topic-specific ad can be automatically displayed based on an ascertained topic related to the browsing sessions. In particular, the monitored activity can be evaluated and examined in order to identify at least one of a theme, a content, a context, a generalized topic, etc. in which a corresponding and related ad can be presented. In other words, a relevant ad can be presented to a user during a browsing session, wherein relevancy is determined by corresponding to the monitored activity within two or more browsing sessions.

At reference numeral 806, a subscription can be provided to a group for at least one of buying power or packaged discount. For instance, a user can subscribe to a group in order to receive packaged discounts, sales, specific ads, offers, etc. In another example, the subscription can be to a group in which a similar interest exists with a particular good or service, and such group can provide leverage in buying power (e.g., the group increases the amount of sales to lower the per-unit cost). At reference numeral 808, private information for a group member can be protected to ensure anonymity. For example, the anonymity of a user can be protected and ensured when joining or utilizing such groups. Thus, private information or data can be secure, wherein such private information or data can be, but is not limited to, credit card information, account information, user name, passwords, personal information (e.g., address, name, date of birth, phone number, social security number, income, email address, zip code, work affiliations, etc.), age, height, weight, personal tasks, etc.

Figure 9:
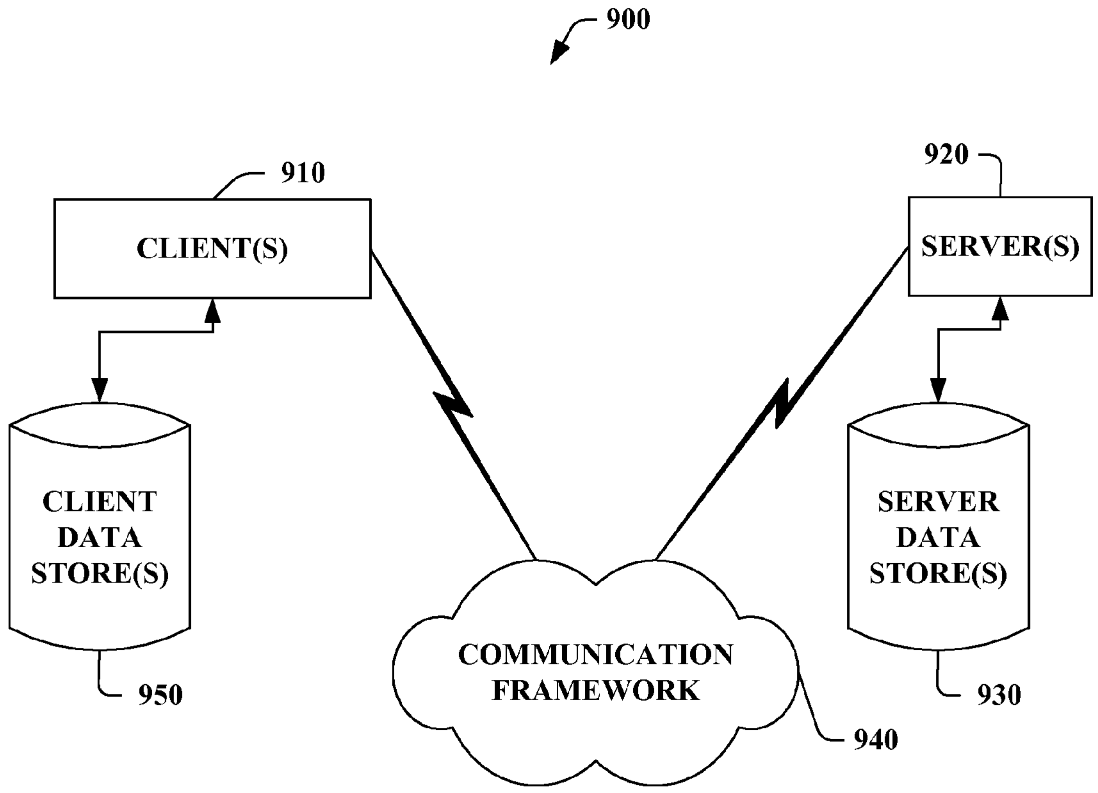
FIG. 9 illustrates an exemplary networking environment, wherein the novel aspects of the claimed subject matter can be employed.
Figure 10:
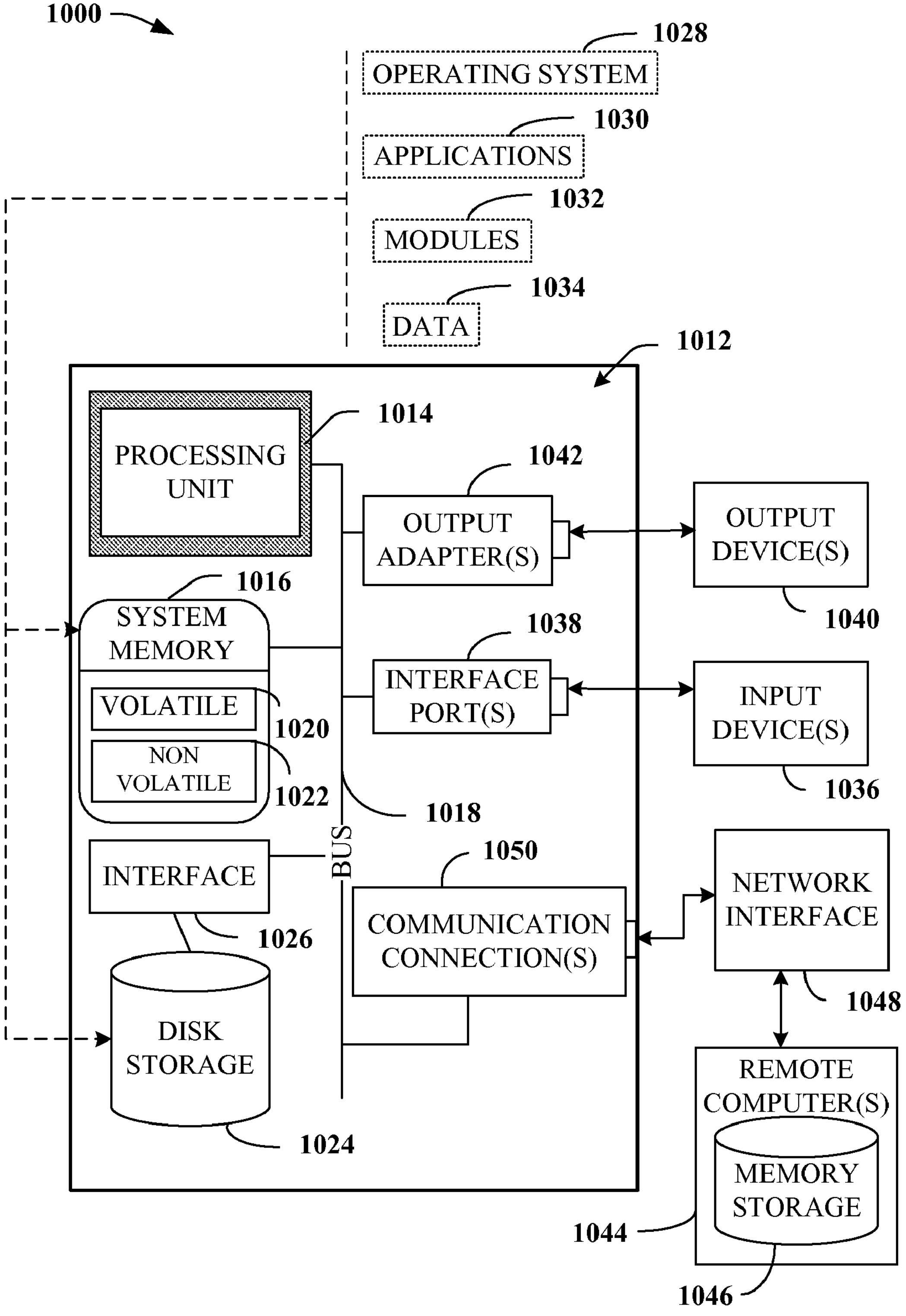
FIG. 10 illustrates an exemplary operating environment that can be employed in accordance with the claimed subject matter.

In order to provide additional context for implementing various aspects of the claimed subject matter, FIGS. 9-10 and the following discussion is intended to provide a brief, general description of a suitable computing environment in which the various aspects of the subject innovation may be implemented. For example, an ad selector that facilitates populating a browsing session with relevant advertisements based on evaluation of concurrent browsing sessions, as described in the previous figures, can be implemented in such suitable computing environment. While the claimed subject matter has been described above in the general context of computer-executable instructions of a computer program that runs on a local computer and/or remote computer, those skilled in the art will recognize that the subject innovation also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based and/or programmable consumer electronics, and the like, each of which may operatively communicate with one or more associated devices. The illustrated aspects of the claimed subject matter may also be practiced in distributed computing environments where certain tasks are performed by remote processing devices that are linked through a communications network. However, some, if not all, aspects of the subject innovation may be practiced on stand-alone computers. In a distributed computing environment, program modules may be located in local and/or remote memory storage devices.

FIG. 9 is a schematic block diagram of a sample-computing environment 900 with which the claimed subject matter can interact. The system 900 includes one or more client(s) 910. The client(s) 910 can be hardware and/or software (e.g., threads, processes, computing devices). The system 900 also includes one or more server(s) 920. The server(s) 920 can be hardware and/or software (e.g., threads, processes, computing devices). The servers 920 can house threads to perform transformations by employing the subject innovation, for example.

One possible communication between a client 910 and a server 920 can be in the form of a data packet adapted to be transmitted between two or more computer processes. The system 900 includes a communication framework 940 that can be employed to facilitate communications between the client(s) 910 and the server(s) 920. The client(s) 910 are operably connected to one or more client data store(s) 950 that can be employed to store information local to the client(s) 910. Similarly, the server(s) 920 are operably connected to one or more server data store(s) 930 that can be employed to store information local to the servers 920.

With reference to FIG. 10, an exemplary environment 1000 for implementing various aspects of the claimed subject matter includes a computer 1012. The computer 1012 includes a processing unit 1014, a system memory 1016, and a system bus 1018. The system bus 1018 couples system components including, but not limited to, the system memory 1016 to the processing unit 1014. The processing unit 1014 can be any of various available processors. Dual microprocessors and other multiprocessor architectures also can be employed as the processing unit 1014.

The system bus 1018 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1016 includes volatile memory 1020 and nonvolatile memory 1022. The basic input/output system (BIOS), containing the basic routines to transfer information between elements within the computer 1012, such as during start-up, is stored in nonvolatile memory 1022. By way of illustration, and not limitation, nonvolatile memory 1022 can include read only memory (ROM), programmable ROM (PROM), electrically programmable ROM (EPROM), electrically erasable programmable ROM (EEPROM), or flash memory. Volatile memory 1020 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1012 also includes removable/non-removable, volatile/non-volatile computer storage media. FIG. 10 illustrates, for example a disk storage 1024. Disk storage 1024 includes, but is not limited to, devices like a magnetic disk drive, floppy disk drive, tape drive, Jaz drive, Zip drive, LS-100 drive, flash memory card, or memory stick. In addition, disk storage 1024 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1024 to the system bus 1018, a removable or non-removable interface is typically used such as interface 1026.

It is to be appreciated that FIG. 10 describes software that acts as an intermediary between users and the basic computer resources described in the suitable operating environment 1000. Such software includes an operating system 1028. Operating system 1028, which can be stored on disk storage 1024, acts to control and allocate resources of the computer system 1012. System applications 1030 take advantage of the management of resources by operating system 1028 through program modules 1032 and program data 1034 stored either in system memory 1016 or on disk storage 1024. It is to be appreciated that the claimed subject matter can be implemented with various operating systems or combinations of operating systems.

A user enters commands or information into the computer 1012 through input device(s) 1036. Input devices 1036 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1014 through the system bus 1018 via interface port(s) 1038. Interface port(s) 1038 include, for example, a serial port, a parallel port, a game port, and a universal serial bus (USB). Output device(s) 1040 use some of the same type of ports as input device(s) 1036. Thus, for example, a USB port may be used to provide input to computer 1012, and to output information from computer 1012 to an output device 1040. Output adapter 1042 is provided to illustrate that there are some output devices 1040 like monitors, speakers, and printers, among other output devices 1040, which require special adapters. The output adapters 1042 include, by way of illustration and not limitation, video and sound cards that provide a means of connection between the output device 1040 and the system bus 1018. It should be noted that other devices and/or systems of devices provide both input and output capabilities such as remote computer(s) 1044.

Computer 1012 can operate in a networked environment using logical connections to one or more remote computers, such as remote computer(s) 1044. The remote computer(s) 1044 can be a personal computer, a server, a router, a network PC, a workstation, a microprocessor based appliance, a peer device or other common network node and the like, and typically includes many or all of the elements described relative to computer 1012. For purposes of brevity, only a memory storage device 1046 is illustrated with remote computer(s) 1044. Remote computer(s) 1044 is logically connected to computer 1012 through a network interface 1048 and then physically connected via communication connection 1050. Network interface 1048 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1050 refers to the hardware/software employed to connect the network interface 1048 to the bus 1018. While communication connection 1050 is shown for illustrative clarity inside computer 1012, it can also be external to computer 1012. The hardware/software necessary for connection to the network interface 1048 includes, for exemplary purposes only, internal and external technologies such as, modems including regular telephone grade modems, cable modems and DSL modems, ISDN adapters, and Ethernet cards.

What has been described above includes examples of the subject innovation. It is, of course, not possible to describe every conceivable combination of components or methodologies for purposes of describing the claimed subject matter, but one of ordinary skill in the art may recognize that many further combinations and permutations of the subject innovation are possible. Accordingly, the claimed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the claimed subject matter. In this regard, it will also be recognized that the innovation includes a system as well as a computer-readable medium having computer-executable instructions for performing the acts and/or events of the various methods of the claimed subject matter.

There are multiple ways of implementing the present innovation, e.g., an appropriate API, tool kit, driver code, operating system, control, standalone or downloadable software object, etc. which enables applications and services to use the advertising techniques of the invention. The claimed subject matter contemplates the use from the standpoint of an API (or other software object), as well as from a software or hardware object that operates according to the advertising techniques in accordance with the invention. Thus, various implementations of the innovation described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it should be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the subject innovation may have been disclosed with respect to only one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A system that facilitates displaying relevant advertisements to a user, comprising:

a processor;

memory communicatively coupled to the processor;

a display engine stored in the memory and executable by the processor that browses a portion of image data during a browsing session and allows navigation of the portion of the image data by a user, the navigation comprising panning and/or zooming of the portion of the image data, wherein the portion of the image data represents a computer displayable multiscale image with a plurality of planes of view in which a first plane and a second plane are alternatively displayable based upon the level of zoom and which are related by a pyramidal volume, the multiscale image including a pixel at a vertex of the pyramidal volume;

an evaluator stored in the memory and executable on the processor that identifies a context associated with the portion of the image data in response to the navigation of the portion of the image data by the user, the context associated with the portion of the image data comprising at least a level of zoom associated with the image data, wherein the evaluator identifies the context based on at least two or more planes of view navigated during the browsing session; and an ad selector stored in the memory and executable on the processor that locates an ad from a data store based on the identified context and seamlessly incorporates and displays the located ad into the browsing session.

2. The system of claim 1, wherein the second plane of view displays a portion of the first plane of view at one of a different scale or a different resolution.

3. The system of claim 1, wherein the second plane of view displays a portion of the image data that is graphically or visually unrelated to the first plane of view.

4. The system of claim 1, wherein the second plane of view displays a portion of the image data that is disparate than a portion of the image data associated with the first plane of view.

5. The system of claim 1, wherein the browsing session includes a 3-dimensional (3D) virtual environment created from a plurality of 2-dimensional (2D) content of an image that is navigated by the user, each portion of the 2D content including a perspective of the image and a portion of the image which is aggregated to create the 3D virtual environment of the image.

6. The system of claim 5, wherein the evaluator identifies the context based further on at least one of the perspective of the image browsed within the 3D virtual environment or the portion of the image browsed within the 3D virtual environment, the ad selector incorporates and displays the selected ad into the 3D virtual environment.

7. The system of claim 1, wherein the evaluator further identifies a context associated with the browsing session by examining an application executing in connection with the browsing session, a user behavior within the browsing session, a portion of profile data, a browsing history related to the browsing session, usage of the browsing session, a portion of implicit user data, a portion of explicit user data, data related to a user preference, and/or an ad interaction history of the user.

8. The system of claim 1, wherein the evaluator further identifies a context associated with the browsing session by examining an application version data, a type of the application, frequency of use of the application, copyright data for the application, a manufacturer of the application, a size of the application, a click frequency within the browsing session, a scroll frequency within the browsing session, a portion of highlighting within the browsing session, an input received during the browsing session, an input device location, a duration of browsing on a particular portion of data, an explicit tagging within the browsing session, a frequency of browsing of a portion of data, a data feed subscription, and/or data related to the user setting for a personalized web site.

9. A method comprising:

under control of one or more processors configured with executable instructions;

browsing a portion of image data during a browsing session;

allowing navigation of the portion of the image data by a user, the navigation comprising panning and/or zooming of the portion of the image data, and the portion of the image data representing a computer displayable multiscale image with a plurality of planes of view in which a first plane and a second plane are alternatively displayable based upon the level of zoom and which are related by a pyramidal volume, wherein the multiscale image includes a pixel at a vertex of the pyramidal volume;

identifying a context associated with the portion of the image data in response to the navigation of the portion of the image data by the user, the context associated with the portion of the image data comprising at least a level of zoom associated with the image data, wherein identifying the context is based on at least two or more planes of view navigated during the browsing session; and locating an ad from a data store based on the identified context and seamlessly incorporates and displays the located ad into the browsing session.

10. The method of claim 9, wherein the second plane of view displays:

a portion of the first plane of view at one of a different scale or a different resolution;

a portion of the image data that is graphically or visually unrelated to the first plane of view; and/or a portion of the image data that is disparate than a portion of the image data associated with the first plane of view.

11. The method of claim 9, wherein the browsing session includes a 3-dimensional (3D) virtual environment created from a plurality of 2-dimensional (2D) content of an image that is navigated by the user, each portion of the 2D content including a perspective of the image and a portion of the image which is aggregated to create the 3D virtual environment of the image.

12. The method of claim 11, wherein identifying the context is based further on at least one of the perspective of the image browsed within the 3D virtual environment or the portion of the image browsed within the 3D virtual environment, the ad selector incorporates and displays the selected ad into the 3D virtual environment.

13. The method of claim 9, further comprising identifying a context associated with the browsing session by examining an application executing in connection with the browsing session, a user behavior within the browsing session, a portion of profile data, a browsing history related to the browsing session, usage of the browsing session, a portion of implicit user data, a portion of explicit user data, data related to a user preference, and/or an ad interaction history of the user.

14. The method of claim 9, further comprising identifying a context associated with the browsing session by examining an application version data, a type of the application, frequency of use of the application, copyright data for the application, a manufacturer of the application, a size of the application, a click frequency within the browsing session, a scroll frequency within the browsing session, a portion of highlighting within the browsing session, an input received during the browsing session, an input device location, a duration of browsing on a particular portion of data, an explicit tagging within the browsing session, a frequency of browsing of a portion of data, a data feed subscription, and/or data related to the user setting for a personalized web site.

15. One or more computer-readable media storing computer-executable instructions that, when executed by one or more processors, configure the one or more processors to perform acts comprising:

browsing a portion of image data during a browsing session;

allowing navigation of the portion of the image data by a user, the navigation comprising panning and/or zooming of the portion of the image data, and the portion of the image data representing a computer displayable multiscale image with a plurality of planes of view in which a first plane and a second plane are alternatively displayable based upon the level of zoom and which are related by a pyramidal volume, wherein the multiscale image includes a pixel at a vertex of the pyramidal volume;

identifying a context associated with the portion of the image data in response to the navigation of the portion of the image data by the user, the context associated with the portion of the image data comprising at least a level of zoom associated with the image data, wherein identifying the context is based on at least two or more planes of view navigated during the browsing session; and locating an ad from a data store based on the identified context and seamlessly incorporates and displays the located ad into the browsing session.

16. The one or more computer-readable media of claim 15, wherein the second plane of view displays:

a portion of the first plane of view at one of a different scale or a different resolution;

a portion of the image data that is graphically or visually unrelated to the first plane of view; and/or a portion of the image data that is disparate than a portion of the image data associated with the first plane of view.

17. The one or more computer-readable media of claim 15, wherein the browsing session includes a 3-dimensional (3D) virtual environment created from a plurality of 2-dimensional (2D) content of an image that is navigated by the user, each portion of the 2D content including a perspective of the image and a portion of the image which is aggregated to create the 3D virtual environment of the image.

18. The one or more computer-readable media of claim 17, wherein identifying the context is based further on at least one of the perspective of the image browsed within the 3D virtual environment or the portion of the image browsed within the 3D virtual environment, the ad selector incorporates and displays the selected ad into the 3D virtual environment.

19. The one or more computer-readable media of claim 15, further comprising identifying a context associated with the browsing session by examining an application executing in connection with the browsing session, a user behavior within the browsing session, a portion of profile data, a browsing history related to the browsing session, usage of the browsing session, a portion of implicit user data, a portion of explicit user data, data related to a user preference, and/or an ad interaction history of the user.

20. The one or more computer-readable media of claim 15, further comprising identifying a context associated with the browsing session by examining an application version data, a type of the application, frequency of use of the application, copyright data for the application, a manufacturer of the application, a size of the application, a click frequency within the browsing session, a scroll frequency within the browsing session, a portion of highlighting within the browsing session, an input received during the browsing session, an input device location, a duration of browsing on a particular portion of data, an explicit tagging within the browsing session, a frequency of browsing of a portion of data, a data feed subscription, and/or data related to the user setting for a personalized web site.

* * * * *